(12) United States Patent  
Beilman, III

(10) Patent No.: US 7,942,432 B2  
(45) Date of Patent: May 17, 2011

(54) LEVELING SYSTEM FOR A VEHICLE AIR SUSPENSION

(75) Inventor: John Peter Beilman, III, Winston-Salem, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 133 days.

(21) Appl. No.: 12/312,760

(22) PCT Filed: Dec. 21, 2006

(86) PCT No.: PCT/US2006/049053  
§ 371 (c)(1),  
(2), (4) Date: May 26, 2009

(87) PCT Pub. No.: WO2008/076123  
PCT Pub. Date: Jun. 26, 2008

(65) Prior Publication Data  
US 2010/0052272 A1    Mar. 4, 2010

(51) Int. Cl.  
*B60G 11/27* (2006.01)
(52) U.S. Cl. .......... 280/124.16; 280/124.157; 280/6.157
(58) Field of Classification Search ........... 280/124.157, 280/124.16, 6.157, 6.159  
See application file for complete search history.

(56) References Cited

U.S. PATENT DOCUMENTS

| | | | |
|---|---|---|---|
| 2,784,978 A | 3/1957 | Seale | |
| 2,921,528 A * | 1/1960 | Muller | 417/199.1 |
| 2,997,314 A | 8/1961 | Hill | |
| 3,073,619 A | 1/1963 | Manning | |
| 3,145,032 A * | 8/1964 | Turek | 280/124.157 |
| 3,214,185 A | 10/1965 | Mason | |
| 3,836,161 A | 9/1974 | Buhl | |
| 3,955,590 A | 5/1976 | Palm | |
| 4,238,128 A * | 12/1980 | McKee | 280/6.152 |
| 4,483,546 A * | 11/1984 | Brearley | 280/6.158 |
| 4,767,126 A * | 8/1988 | Bois et al. | 280/6.151 |
| 5,167,289 A * | 12/1992 | Stevenson | 177/141 |
| 5,725,066 A * | 3/1998 | Beard et al. | 180/89.12 |
| 5,860,450 A * | 1/1999 | Trudeau et al. | 137/627.5 |
| 6,224,074 B1 | 5/2001 | Cadden | |
| 6,412,789 B1 | 7/2002 | Pierce | |
| 6,513,820 B2 * | 2/2003 | Schoop | 280/124.157 |
| 6,845,989 B2 | 1/2005 | Fulton | |
| 2004/0178005 A1* | 9/2004 | Carlstrom et al. | 177/139 |
| 2007/0085292 A1* | 4/2007 | Hecker et al. | 280/124.16 |

FOREIGN PATENT DOCUMENTS

GB    810644    3/1959

* cited by examiner

*Primary Examiner* — Ruth Ilan  
(74) *Attorney, Agent, or Firm* — Martin Farrell; Michael Pruden

(57) ABSTRACT

A system for maintaining a vehicle front end air spring suspension level, for a vehicle having a designed load imbalance, includes a height control valve mounted on the higher load side of the vehicle and controlling compressed air to the air springs of the vehicle suspension. A pressure reduction valve is interposed in a conduit feeding the air spring on the lower loaded side, the pressure reduction valve being set to reduce the pressure of air delivered to the second air spring.

2 Claims, 2 Drawing Sheets

LEVELING SYSTEM FOR A VEHICLE AIR SUSPENSION

The invention relates to air suspensions for vehicles of the type having air springs controlled by a height control valve. More specifically, the invention relates to a leveling system for a vehicle air suspension for vehicles having a known load imbalance that can automatically maintain the vehicle as level from side to side.

BACKGROUND AND SUMMARY OF THE INVENTION

In some vehicles the side to side loading is intentionally unbalanced, for example, the front left or driver side of a vehicle will be unbalanced when a driver is present. In addition, the driver side has the steering column and mechanism, the instrument panel, and may include other components such as the power steering pump and batteries. The suspension in such vehicles can be designed to accommodate the imbalance by providing stiffer springs, for example. However, this may result in an uncomfortable ride for the driver and passengers. In air suspensions, a side to side imbalance can be accommodated by controlling the air pressure in the air springs.

Height control valves are used to control the height of an air spring by controlling the air pressure, and are used to accommodate imbalance by supplying air to the air springs to maintain both sides of vehicle at a common height. Typically, two height control valves are used, with one on each side of a vehicle to independently control the air pressure in the air springs on each side. However, height control valves are expensive and relatively low reliability items. It is difficult to adjust the height control valves on each side to maintain the same height. In addition, using two height control valves increases the complexity of the suspension system, requiring additional components and air lines.

As a result, illustrated in FIGS. 1 and 2, some air suspension systems utilize a single height control valve 10 to maintain ride height and level of the frame 12. The frame 12 is supported on the axle 14 by air springs 16, 18. Such systems, however, are susceptible to difficulty in side-to-side weight imbalances. Because the height control valve reacts to load conditions for the side of the vehicle on which it is mounted, the opposite side receives the same air pressure. When the load L on each side of the vehicle is the same, as illustrated in FIG. 1, equal air pressure (indicated by gauges 32, 34) in the air springs 16, 18 results in level height of the frame 12. However, because the load on the air springs may be different on the opposite side (and in the case of the designed imbalance, is normally different), the air springs on opposite sides of the vehicle may be set to different heights. This manifests itself, for example, in a leaning chassis that uses this type of air suspension with a single height control valve, as illustrated in FIG. 2, where the load L1 is greater than the load L2, and equal air pressure results in the air spring 16 on the left side of the figure being at a greater height than the air spring 18 on the right side in the figure under the greater load L1.

To correct for the tilting that results from a single height control valve controlling for an unbalanced load, one or more spacers 22 may be added under the air spring 18 on the side with the higher load L1 to accommodate the unequal loading. This is shown in FIG. 3.

While a spacer can correct for a leaning chassis caused by unequal loading and equal air pressure in the air springs, its use has disadvantages. Spacers are difficult to adjust and do not consistently give a predictable result.

To overcome these deficiencies in the art, the invention proposes a new system for maintaining the chassis level in a front air suspension of a truck having a known imbalance.

The system according to the invention utilizes a single height control valve in conjunction with a pressure reduction valve. The pressure reduction valve (PRV) is interposed in the air line feeding the opposite side air springs to reduce the pressure to the air springs on the side of the chassis that has less load. The pressure reduction valve may be permanently preset to account for consistent weight biases. Alternatively, the pressure reduction valve may be adjustable to allow tuning of the vehicle stance.

DETAILED DESCRIPTION

Figure 4:
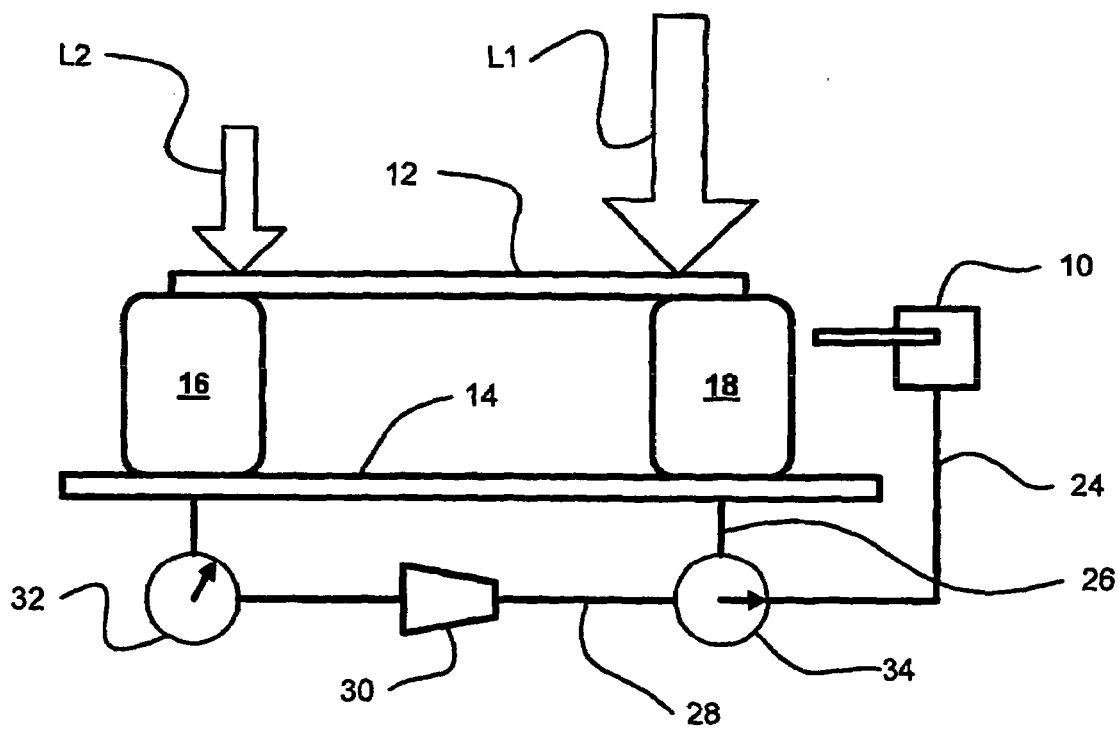

An air suspension for a vehicle front end with a designed load imbalance is shown in FIG. 4. The air suspension includes a frame 12 supported on an axle 14 by air springs 16, 18 disposed on opposite ends of the axle. A single height control valve 10 is mounted on the left or driver's side of the frame 12 (the right side in the figure), and reacts to changes in height to that side of the vehicle. A source of pressurized air (not illustrated) is connected to the height control valve, which may conveniently be the vehicle air reservoir. The height control valve 10 is connected by an air line 24 having a first branch 26 connected to the air spring 18. The height control valve 10 will cause an increase in air pressure in air spring 18 when it senses that side of the frame 12 in a lower than normal position.

Figure 1:
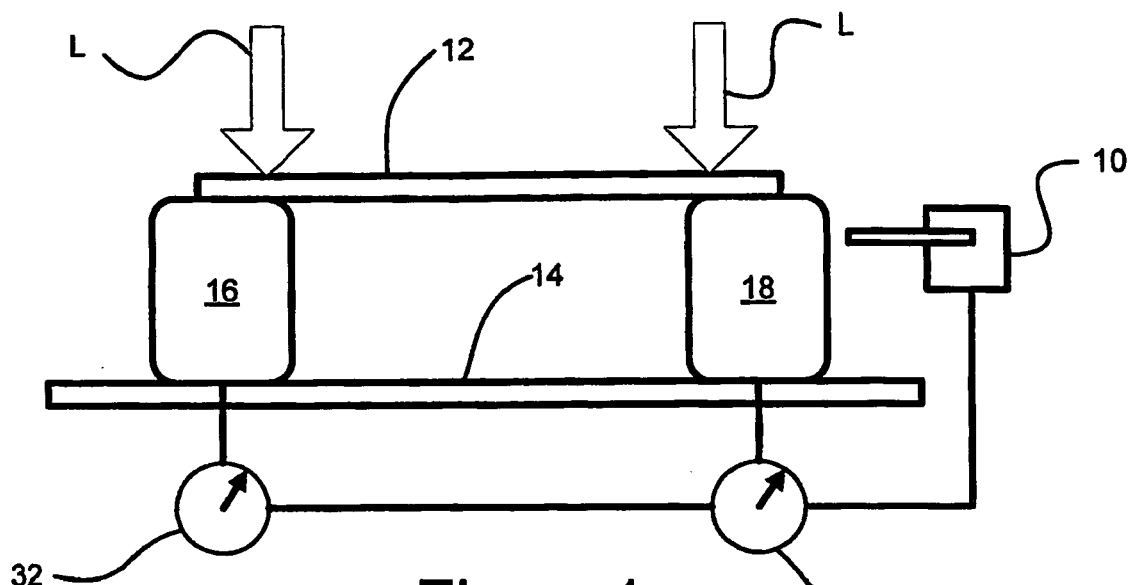
FIG. 1 shows schematically an air suspension using a single height control valve to control the air springs on both sides of the vehicle.
Figure 2:
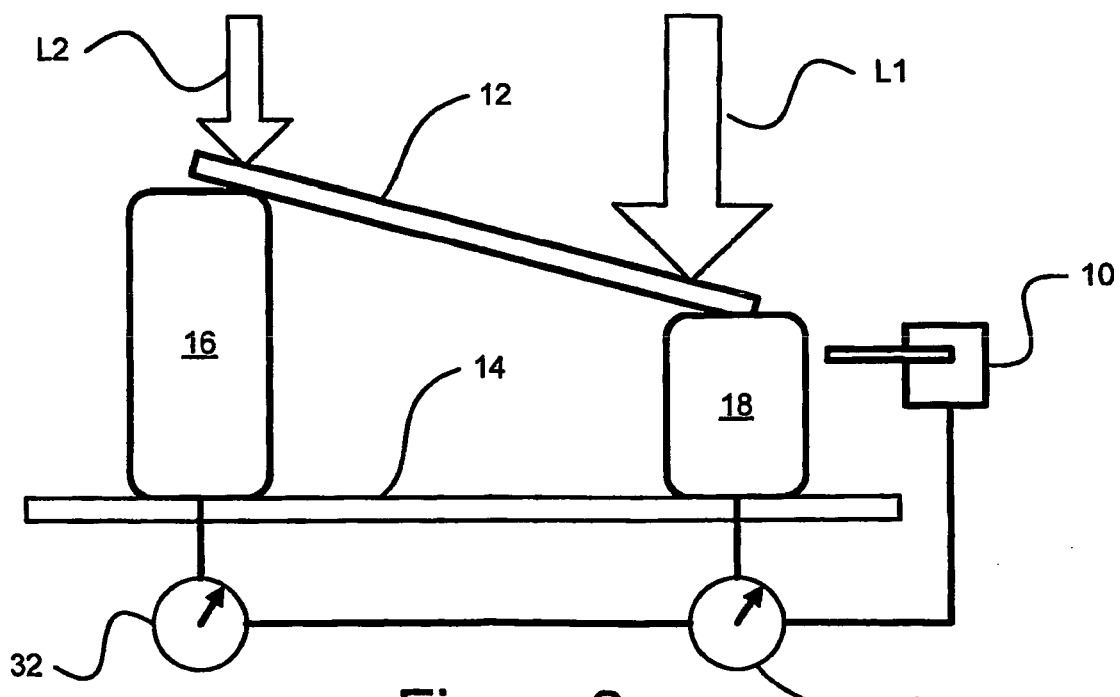
FIG. 2 illustrates the air suspension of FIG. 1 during a load imbalance causing a greater load on one side of the suspension.
Figure 3:
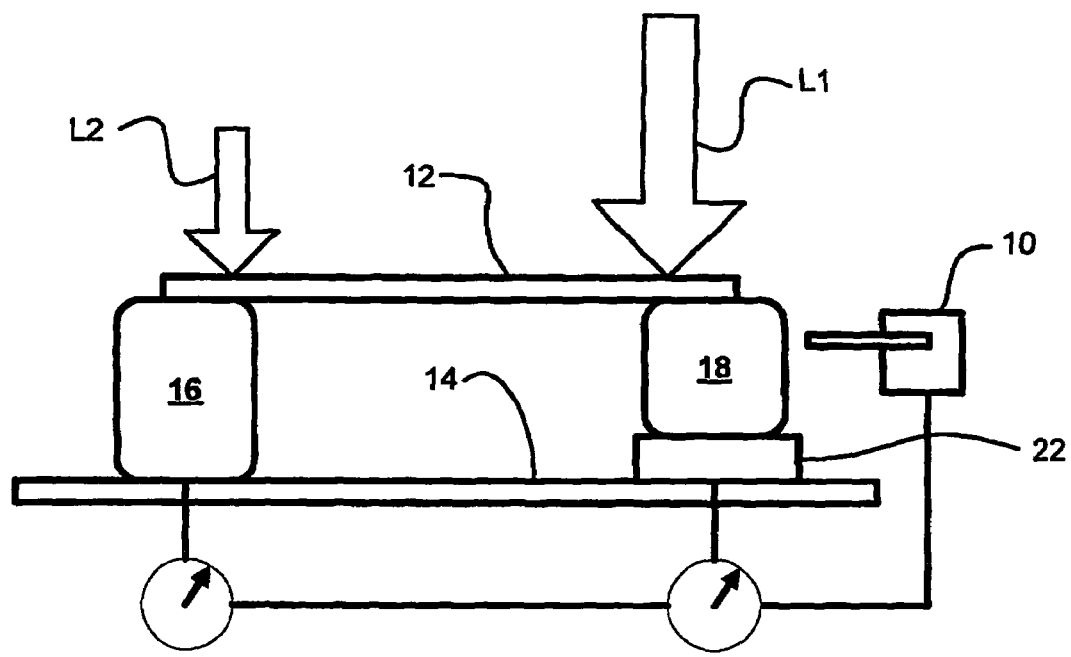
FIG. 3 illustrates an air suspension using a single height control valve with a spacer interposed on the higher loaded side to accommodate the effect of uniform pressure in the air springs; and, FIG. 4 illustrates schematically an air suspension in accordance with the invention.

The height control valve 10 is connected also to the air spring 16 on the opposite end of the axle 14 through an air line second branch 28. Interposed in the second branch 28 is a pressure reduction valve 30. The pressure reduction valve 30 acts to reduce the pressure of the air supplied to air spring 16 to avoid the over-pressure situation illustrated in FIG. 2. The air spring 16 on the side opposite the height control valve 10 thus receives air at a pressure lower than the air spring 18 on the same side as the height control valve. As a result, the frame 12 can be maintained level despite an imbalanced load on the height control valve side. The pressure in the air springs 16, 18 is different, as indicated by the gauge representations 32, 34, to accommodate the different loads from side to side.

The load imbalance in a vehicle front air suspension consists of known elements in the components mounted on one side, and a predictable element in the weight of the driver. The pressure reduction valve 30 may be permanently set for a pressure reduction, for example, 20 psi. Alternatively, the pressure reduction valve 30 may be adjustable to allow fine tuning of the suspension. Suitable pressure reduction valves include the RV-1 valve available from Bendix Commercial Vehicle Systems.

The invention has been described in terms of preferred embodiments and components, however, those skilled in the art will recognize that substitutions of equivalents may be made without departing from the scope of the invention as defined in the appended claims.

What is claimed is:

1. A vehicle front end air suspension with a leveling system, comprising:
   a vehicle frame loaded with an imbalance on a first side of the front end;
   at least one air spring disposed on each side of the vehicle frame;
   a height control valve having a connection to receive compressed air from a compressed air source and having an output port, the height control valve mounted on the first side of the front end;
   a conduit connected to the output port of the height control valve and connected to inlet ports of the at least one air spring on each side of the vehicle, the conduit having a first branch to connect to a first air spring on the first side of the front end and a second branch to connect to a second air spring on a second side of the front end; and,
   a pressure reduction valve interposed in the second branch and set to reduce the pressure of air delivered to the second air spring without affecting the pressure of air delivered to the first air spring.

2. The system as claimed in claim 1, wherein the pressure reduction valve is adjustable.

* * * * *